June 21, 1966  J. A. MACE  3,256,634
ANIMATED DISPENSING BOOK PACKAGE
Filed Feb. 18, 1963
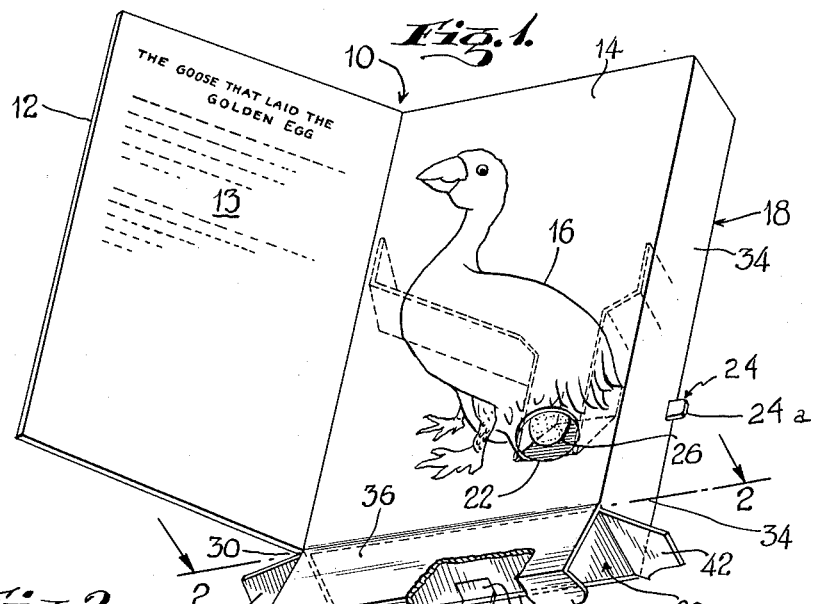
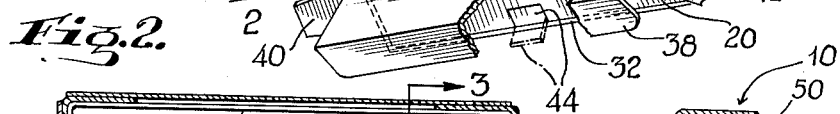
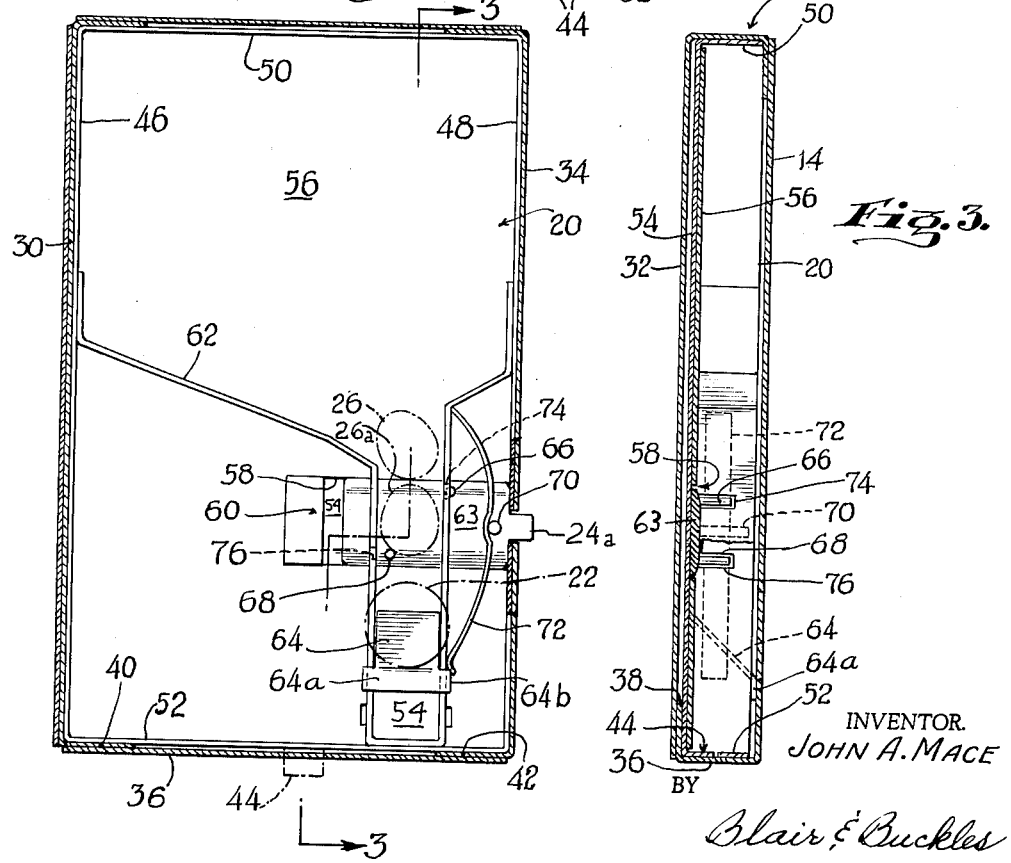
INVENTOR.
JOHN A. MACE
BY
Blair & Buckles
ATTORNEYS United States Patent Office 3,256,634
Patented June 21, 1966

3,256,634
ANIMATED DISPENSING BOOK PACKAGE
John A. Mace, 24 Hunting Ridge Road, Stamford, Conn.
Filed Feb. 18, 1963, Ser. No. 259,091
3 Claims. (Cl. 46—11)

This invention relates to a novel compound package comprising a story book combined with a dispenser of objects pertinent to the subject or theme of the book. The "story" package dispenses the objects, preferably one by one, to "animate" the book. In one embodiment of the invention the object pops into view through the illustration. This novel animation amuses and entertains children and adults alike, and adds a new dimension of reality to fables and limericks.

The invention also provides a novel package for introducing children to items, such as vitamins or soap for example, with delight and surprise, to transform their potential fears and negative attitudes to enthusiastic reception and interest.

It is an object of the invention to provide new animation for visible intelligence indicia, as found in books. Another object of the invention is to provide a novel entertaining gift package for numerous articles and objects.

It is also an object of the invention to provide a novel package for introducing children to items and goods in a manner that promotes their ready acceptance.

A further object of the invention is to provide a novel "candy book" combining a children's book with a candy pellet dispenser, and another object of the invention is to provide books and packages of the above character that can be manufactured at a low cost.

Other objects of the invention will in part be obvious and will in part appear hereinafter.

The invention accordingly comprises an article of manufacture possessing features, properties, and the relation of elements which will be exemplified in the article hereinafter described, and the scope of the invention will be indicated in the claims.

For a fuller understanding of the nature and objects of the invention, reference should be had to the following detailed description taken in connection with the accompanying drawings, in which:

FIGURE 1 is a perspective view of a candy book embodying the invention, with the candy book partly open and broken away to show details of a suitable construction;

FIGURE 2 is a sectional plan view of the candy book of FIGURE 1 taken along line 2—2 of FIGURE 1; and FIGURE 3 is a side elevation section view taken along line 3—3 of FIGURE 2.

In general, the invention is embodied in a book having a concealed container and dispenser of one or more objects that are pertinent to the subject of the book. When the reader operates the dispenser, an object pops into view to animate the book. The books are preferably constructed with a readily removable and replaceable dispensing container that can readily be refilled with the objects to be dispensed. With this construction the animated books provide many hours of happy and wholesome entertainment.

In the illustrated embodiment of the invention, a candy book has a concealed container storing candies that are delivered by the dispenser one at a time to animate an illustrated story. As seen in FIGURE 1, the animated book indicated generally at 10 can have one or more pages bound between a front cover 12 and a back cover 14. The illustrated book has a single page 13 printed on the inside of the front cover 12. An illustration 16 appears on the inside of the back cover 14, which forms a support housing 18 for a removable object containing and dispensing unit indicated generally at 20.

A hole 22 is formed through the back cover 14 and appropriately positioned with respect to the illustration 16 so that operating a dispenser actuator 24 causes an object 26 to pop into view through the hole 22 to animate the illustration.

The story of the illustrated book 10 is "The Goose That Laid the Golden Egg" and the goose is appropriately shown in the illustration 16. The objects 26 are golden eggs, suitably made of foil covered chocolates.

Considering the construction of the candy book 10 illustrated in the figures, the book covers 12 and 14 and the housing 18, formed as a box, are formed in one piece from suitable paper or paperboard material. The one piece construction comprises the successive panels forming the front cover 12, housing side 30, housing bottom 32, housing side 34, and back cover 14, which serves as the housing top. The housing 18 is closed at each end as seen in FIGURE 1 by an end panel 36, having an integral tap 38, extending from the panel of the book back cover 14. Tabs 40 and 42 are formed on each of the housing sides 30 and 34 respectively to complete the housing closure.

When the housing end is closed, as shown in FIGURES 2 and 3, the end panel 36 extends between the back cover 14 and the housing bottom 32, with the tab 38 inserted between the unit 20 and housing bottom 32. The tabs 40 and 42 are tucked under the end panel 36.

The dispensing unit 20 is readily removable from the housing 18 by opening the end panel 36 as shown in FIGURE 1 and sliding the unit out through the opened housing end. A tab 44, best seen in FIGURE 1, is provided on the unit 20 to facilitate its removal from the housing 18.

As seen in FIGURES 2 and 3, the unit 20 is constructed as a tray having sides 46 and 48, ends 50 and 52, and a bottom 54, all preferably formed in unitary manner from a single sheet of suitable material.

The dispenser of the container-dispenser tray unit 20 is constructed with a bottom panel 56 generally overlying the tray bottom 54. The bottom panel 56 is cut away to form a recessed actuator guide 58, seen in FIGURES 2 and 3. A flap of the material cut away from the bottom panel 56 to form the recessed guide 58 is folded back to form an elevated stop 60, seen in FIGURE 2 at the left end of the guide 58. The stop 60 limits the depressed movement of the actuator 24.

An article guide chute 62 is assembled, preferably from a single strip of material, in the dispenser unit 20. At the bottom of the chute 62, a ramp 64 carries the objects 26 forward to deliver them through the hole 22 in the illustration 16 of FIGURE 1. The ramp 64 is suitably cut from the dispenser bottom panel 56 and folded upward as best seen in FIGURE 3 to its ramp position. Integral tabs 64a and 64b extend across the walls of the chute 62 as seen in FIGURES 2 and 3 and maintain the ramp in this position.

As seen in FIGURES 2 and 3, the illustrated actuator 24 is constructed with a transversely slidable bar 63 from which the narrower button 24a extends to protrude through an aperture in the side 34 of housing 18. The bar 63 is disposed in the recessed guide 58 and has two upstanding gate pins 66 and 68 spaced apart in the region of chute 62 as seen in FIGURE 2, and an upstanding post 70 between chute 62 and actuator button 24a. A leaf spring 72 is compressed between the post 70 and the outer side of the chute 62 to urge the bar 63 to the closed position shown in FIGURES 1 and 2 where its button 24a protrudes from the unit 20 and the gate pin 68 blocks objects from passing down the chute. As seen in FIGURE 3, the chute walls are formed with slots 74 and 76 through which the gate pins 66 and 68 pass respectively when the actuator 24 is operated by depressing the button 24a to slide the bar 63 along the guide 58 against the stop 60. With the actuator 24 thus depressed, the pin 68 is moved out of the chute 62, into the slot 76, to dispense one object, shown in FIGURE 2 as the object 26a. The pin 66 is disposed in the chute 62 to block additional objects from being dispensed.

Other animated book packages constructed as described above may have several pages. Moreover, the book and particularly the object containing and dispensing unit can be made with numerous different constructions. According to one alternative construction, the dispensing tray unit 20 is constructed from a unitary formed plastic sheet fitted with a suitable mechanism for dispensing the objects 26.

The material from which the object dispensing unit is formed should be suitable for storing the objects without deterioration. Suitable paperboard and other materials for storing candy, soap, vitamin tablets, and similar objects are well known to those skilled in the art.

In summary, described above is a book package for storing and dispensing objects that animate the story of the book. It will be seen that the objects set forth above, among those made apparent from the preceding description, are efficiently attained with the package. Since certain changes may be made in the above package without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention which, as a matter of language, might be said to fall therebetween.

Having described the invention, what is claimed as new and secured by Letters Patent is:

1. An animated book package comprising in combination
    (A) a metering dispensing container in said book package,
        (1) a movable dispensing actuator
        (2) guide means in said container guiding dispensed objects,
    (B) a book having front and back covers,
        (1) an illustration for said book on the inside of said back cover,
        (2) a support on the outside of said back cover for removably carrying said container behind said illustration so that the objects in said container are concealed,
        (3) means forming a dispensing aperture through said back cover
            (a) said aperture being disposed with respect to said guide means so that dispensed objects are delivered to said aperture, and
            (b) said aperture being so disposed with respect to said illustration that the appearance of a dispensed object at said aperture animates said illustration.

2. The book package defined in claim 1 further comprising a plurality of objects stored in said unit
    (A) said objects relating to the story presented in said book and to said illustration on said back cover.

3. The book package defined in claim 1 in which
    (A) said support is formed as a rectangular box on the outside of said back cover behind said illustration,
    (B) said dispensing container is a tray removably fitted in said support box through an end thereof,
    (C) said book and support are unitarily formed from a sheet of suitable material having contiguous panels successively forming said book front cover, a first side of said support box, the back of said support box, a second side of said support box, and said back cover, and
    (D) said guide means comprises a ramp in said tray communicating with the side of said aperture to guide dispensed objects through said aperture.

References Cited by the Examiner

UNITED STATES PATENTS

| | | | |
|---|---|---|---|
| 1,490,295 | 4/1924 | Stephens | 46—36 X |
| 1,940,909 | 12/1933 | Herman | 221—194 X |
| 1,999,021 | 4/1935 | Marsh | 312—42 X |
| 2,114,824 | 4/1938 | Watsky | 46—34 |
| 2,344,437 | 3/1944 | Lande | 46—11 X |
| 2,479,488 | 8/1949 | Goldfarb | 46—124 |
| 2,706,066 | 4/1955 | Wells | 221—197 X |

FOREIGN PATENTS

| | | |
|---|---|---|
| 21,155 | 1905 | Great Britain. |

RICHARD C. PINKHAM, *Primary Examiner.*